United States Patent
Kubota

4,143,945
Mar. 13, 1979

[54] SMALL RETRO-FOCUS WIDE ANGLE PHOTOGRAPHIC LENS SYSTEM

[75] Inventor: Toshifumi Kubota, Tokyo, Japan

[73] Assignee: Asahi Kogaku Kogyo Kabushiki Kaisha, Tokyo, Japan

[21] Appl. No.: 819,726

[22] Filed: Jul. 28, 1977

[30] Foreign Application Priority Data

Jul. 29, 1976 [JP] Japan ................... 51/90572

[51] Int. Cl.² .............................................. G02B 9/64
[52] U.S. Cl. ..................... 350/214; 350/176; 350/177
[58] Field of Search ................. 350/176, 177, 214

[56] References Cited

U.S. PATENT DOCUMENTS

| 3,740,120 | 6/1973 | Rühl | 350/177 X |
| 4,018,511 | 4/1977 | Takahashi | 350/214 |
| 4,019,810 | 4/1977 | Sugiyama | 350/214 |

FOREIGN PATENT DOCUMENTS

2574369  8/1966  Japan ........................... 350/214

*Primary Examiner*—Paul A. Sacher
*Attorney, Agent, or Firm*—Sughrue, Rothwell, Mion, Zinn and Macpeak

[57] ABSTRACT

A retro-focus wide angle photographic lens system comprises a front lens group including first and third negative meniscus lenses each having one surface greater in curvature than the other and oriented toward an image, and a second positive lens, and a rear lens group including a fourth positive lens, a fifth negative lens, and sixth and seventh positive lenses each having one surface greater in curvature than the other and oriented toward the image. The various lens system parameters are selected within the limits of and to satisfy a plurality of mathematical expressions, in order to optimize miniaturization while still retaining satisfactory optical characteristics.

3 Claims, 6 Drawing Figures

SMALL RETRO-FOCUS WIDE ANGLE PHOTOGRAPHIC LENS SYSTEM

BACKGROUND OF THE INVENTION

This invention relates to an improved retro-focus type wide angle photographic lens system which is particularly suited to miniaturization.

SUMMARY OF THE INVENTION

Briefly, and in accordance with the present invention, a retro-focus wide angle photographic lens system comprises a front lens group including first and third negative meniscus lenses each having one surface greater in curvature than the other and oriented toward an image, and a second positive lens, and a rear lens group including a fourth positive lens, a fifth negative lens, and sixth and seventh positive lenses each having one surface greater in curvature than the other and oriented toward the image. The various lens system parameters are selected within the limits of and to satisfy a plurality of mathematical expressions, in order to optimize miniaturization while still retaining satisfactory optical characteristics.

DETAILED DESCRIPTION OF THE PREFERRED EMBODIMENTS

Figure 1:
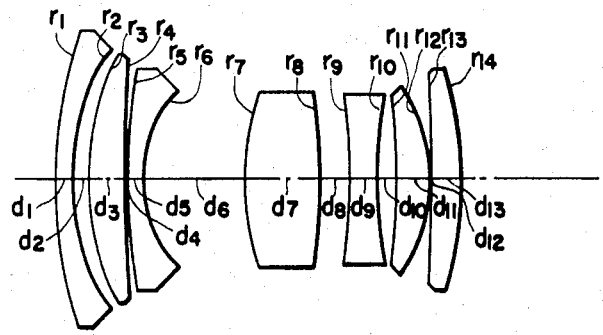
FIG. 1 shows a sectional view of the lens system of Example I according to the invention.
Figure 2:
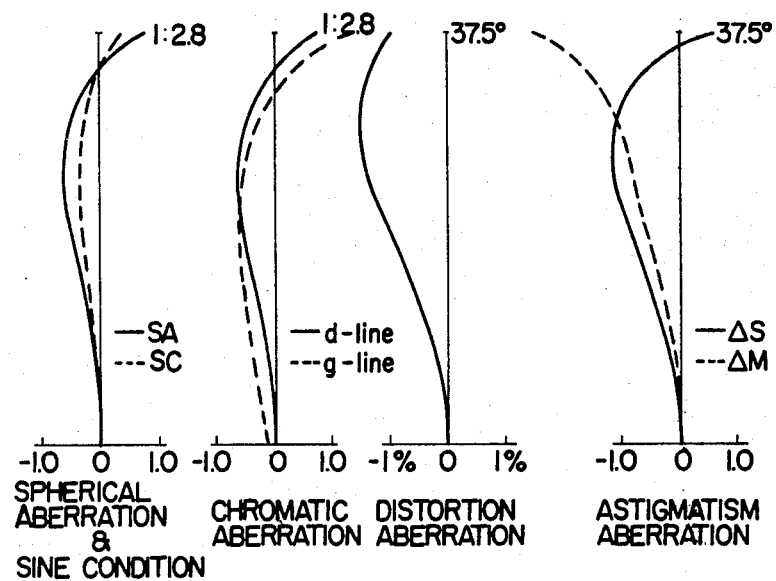
FIG. 2 shows graphical representations of the aberration curves for the lens system of Example I.
Figure 3:
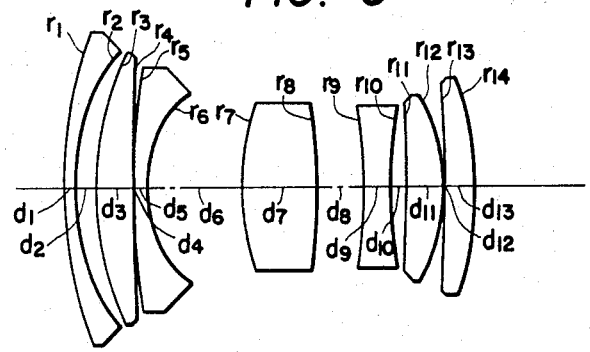
FIG. 3 shows a sectional view of the lens system of Example II according to the invention.
Figure 4:
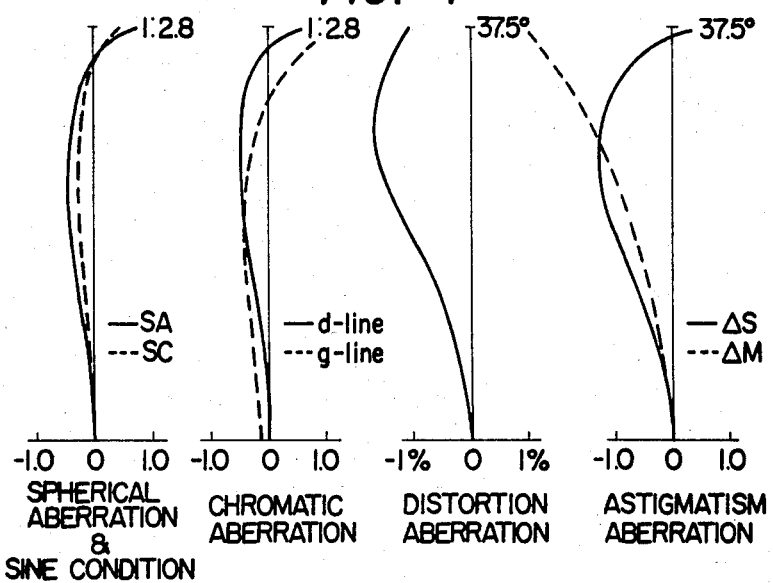
FIG. 4 shows graphical representations of the aberration curves for the lens system of Example II.
Figure 5:
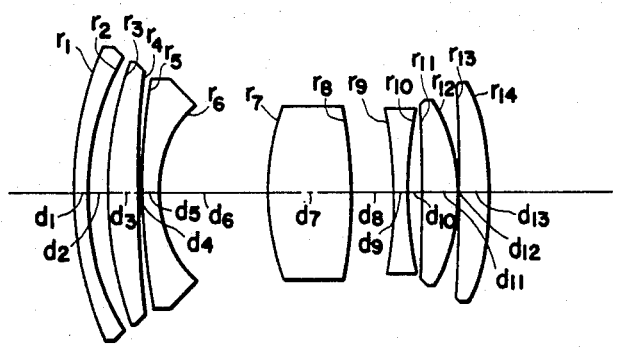
FIG. 5 shows a sectional view of the lens system of Example III according to the invention.
Figure 6:
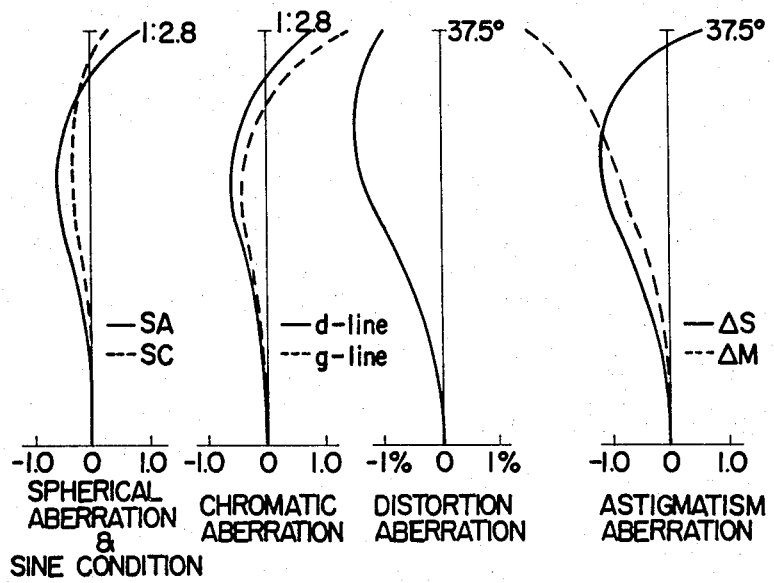
FIG. 6 shows graphical representations of the aberration curves for the lens system of Example III.

This invention relates to a compact wide angle photographic lens system comprising the seven lenses as described above and satisfying the following conditions:

$$0.25F < d_6 < 0.38F, \quad (1)$$

$$\frac{F}{1.3} < |F_{1.2.3}| < \frac{F}{0.7} \cdot F_{1.2.3} < 0, \quad (2)$$

$$\frac{F}{0.8} < F_{1.2.3.4} < \frac{F}{0.5}, \quad (3)$$

$$\frac{F}{1.15} < |F_{1.2.3.4.5}| < \frac{F}{0.65} \cdot F_{1.2.3.4.5} < 0, \quad (4)$$

$$F < \Sigma d < 1.5F, \text{ and} \quad (5)$$

$$0.25 < \frac{df}{db} < 0.5, \quad (6)$$

wherein:

F is the composite focal distance of the entire lens system, $F_{1.2....i}$ is the composite focal distance of the first through the ith lenses, dj is the lens thickness or lens distance of the ith lens, $\Sigma d$ is the sum of all the lens thickness and lens distances, df is the sum of the lens thicknesses and lens distances in the front group, and db is the sum of the lens thicknesses and lens distances in the rear group.

It should be noted that the distance $d_6$ shown in the accompanying figures represents the distance between the front and rear lens groups and is not to be considered with either lens group in the above conditions (1)–(6).

Condition (1) establishes the back-focus at a suitable value in relation to condition (2), and mutually correlates the negative lenses in the front group and the positive lenses in the rear group, which is essential to miniaturize the lens system. To obtain a desired back-focus when $d_6$ is less than 0.25F the power of the first and third negative lenses must be increased to a value exceeding the lower limit defined by condition (2), which deteriorates the coma aberration and reduces the sum of Petzval's lenses. In contrast, when $d_6$ is greater than 0.38F the desired back-focus can easily be obtained, but additional components are then required to implement miniaturization. On the other hand, when $F_{1.2.3}$ exceeds the upper limit of condition (2), it is necessary to lengthen the back-focus by allowing $d_6$ to exceed 0.38F, and this works against miniaturization.

Conditions (3) and (4) determine the negative power of the fifth lens. Condition (3) also determines the power of the fourth lens in conjunction with condition (2), to thereby maintain a color aberration balance which is determined in relation to the selection of the lens glass material. In other words, condition (3) serves to "uncorrect" or compensate for the excessive color aberration correction provided by the front lens group, and establishes a positive lens to correct other aberrations.

When $F_{1.2.3.4}$ is shorter than the lower limit F/0.8 of condition (3), in conjunction with condition (2), the sum of Petzval's lenses is reduced, the back-focus is decreased, and various aberrations increase, which leads to diminished color aberration correction. The aberration can be lowered, but only at the expense of more costly lens glass material. When $F_{1.2.3.4}$ is longer than F/0.5 the color aberration correction is too excessive to maintain a balanced color aberration correction throughout the entire lens system, which, in conjunction with condition (4), necessitates a change in the power of the fifth lens. Condition (3) is also useful for preventing irregularities in the image formed by light beams having a low incident height.

Condition (4) determines the power of the fifth lens together with the above relationships, and corrects color aberration, spherical aberration, and coma aberration.

When $|F_{1.2.3.4.5}|$ is longer than F/0.65 the power of the fifth lens is weak and it is difficult to correct the color aberration, whereby it is desirable to use high dispersion lens glass material. Such glass material is not currently available, however, whereby extremely low dispersion glass material is employed for the six and seventh lenses. In this case, however, the aberration is likely to be poorly balanced. Accordingly, the glass material employed in the examples below is the highest quality material available at present. In contrast, if $|F_{1.2.3.4.5}|$ is shorter than F/1.15 the powers of the sixth and seventh lenses are increased which increases the aberration. Furthermore, although such a short composite focal distance may be advantageous for color aberration, it reduces the Petzval's sum and the radius of curvature, which leads to poorly balanced aberration.

Condition (5) defines the overall length of the lens system within the limits of miniaturization. If it exceeds the upper limit it is impossible to adequately miniaturize the lens system; if it exceeds the lower limit the aberration effects are markedly increased. Furthermore, if the limits of condition (5) are expanded the benefits of miniaturization are offset by the requirements of the focusing mechanism.

Condition (6) establishes the relationships between the lengths of the front lens group and the rear lens group. In order to maintain a small lens diameter it is necessary for the lenses in the front group to be in close contact with one another; this makes the rear lens group rather lengthly, however, due to aberration correction, and therefore condition (6) must be considered in relation to condition (1). When df/db is smaller than 0.25 db is too long or df is too short, which leads to an increase or decrease in the lens diameter. This is undesirable because it will cause problems with respect to the admitted quantity of light and aberration correction. In contrast, when df/db is larger than 0.5 there is a tendency for the front lens group to increase in diameter, which works against miniaturization.

Several examples of lens systems according to this invention are defined by the following data tables, wherein:

rk is the radius of curvature of the kth lens,
ni is the d-line refractive index of the ith lens,
νi is the Abbe's number of the ith lens,
$f_B$ is the back-focus, and
ω is the half picture angle.

EXAMPLE I

| | | F = 100mm, f = 1 : 2.8, ω = 37.5° | | | |
|---|---|---|---|---|---|
| $r_1$ = | 143.59 | $d_1$ = | 4.28 | $n_1/\nu_1$ = | 1.49782/66.8 |
| $r_2$ = | 68.16 | $d_2$ = | 4.98 | | |
| $r_3$ = | 84.19 | $d_3$ = | 11.72 | $n_2/\nu_2$ = | 1.69350/50.8 |
| $r_4$ = | 774.17 | $d_4$ = | 0.35 | | |
| $r_5$ = | 207.28 | $d_5$ = | 4.21 | $n_3/\nu_3$ = | 1.60311/60.7 |
| $r_6$ = | 33.88 | $d_6$ = | 30.00 | | |
| $r_7$ = | 88.03 | $d_7$ = | 22.81 | $n_4/\nu_4$ = | 1.80440/39.6 |
| $r_8$ = | −167.97 | $d_8$ = | 10.88 | | |
| $r_9$ = | −147.36 | $d_9$ = | 8.14 | $n_5/\nu_5$ = | 1.80518/25.4 |
| $r_{10}$ = | 104.93 | $d_{10}$ = | 5.16 | | |
| $r_{11}$ = | −278.94 | $d_{11}$ = | 10.81 | $n_6/\nu_6$ = | 1.49700/81.3 |
| $r_{12}$ = | −47.19 | $d_{12}$ = | 0.35 | | |
| $r_{13}$ = | −529.61 | $d_{13}$ = | 8.74 | $n_7/\nu_7$ = | 1.64000/60.2 |
| $r_{14}$ = | −97.85 | | | | |
| $f_B$ = 129.14 | | | | | |
| $F_{1.2.3.}$ = −94.7 | | | | | |
| $F_{1.2.3.4.}$ = 140.04 | | | | | |
| $F_{1.2.3.4.5.}$ = −119.15 | | | | | |

EXAMPLE II

| | | F = 100mm, f = 1 : 2.8, ω = 37.5° | | | |
|---|---|---|---|---|---|
| $r_1$ = | 116.22 | $d_1$ = | 4.49 | $n_1/\nu_1$ = | 1.65160/58.6 |
| $r_2$ = | 73.68 | $d_2$ = | 6.21 | | |
| $r_3$ = | 95.43 | $d_3$ = | 11.44 | $n_2/\nu_2$ = | 1.67790/50.7 |
| $r_4$ = | 2280.70 | $d_4$ = | 0.35 | | |
| $r_5$ = | 313.12 | $d_5$ = | 4.04 | $n_3/\nu_3$ = | 1.62041/60.3 |
| $r_6$ = | 36.24 | $d_6$ = | 28.07 | | |
| $r_7$ = | 85.63 | $d_7$ = | 21.96 | $n_4/\nu_4$ = | 1.80440/39.6 |
| $r_8$ = | −226.37 | $d_8$ = | 14.91 | | |
| $r_9$ = | −109.82 | $d_9$ = | 7.68 | $n_5/\nu_5$ = | 1.80518/25.4 |
| $r_{10}$ = | 120.09 | $d_{10}$ = | 3.96 | | |
| $r_{11}$ = | −1087.71 | $d_{11}$ = | 11.75 | $n_6/\nu_6$ = | 1.61800/63.4 |
| $r_{12}$ = | −51.82 | $d_{12}$ = | 0.35 | | |
| $r_{13}$ = | −421.05 | $d_{13}$ = | 8.46 | $n_7/\nu_7$ = | 1.64000.60.2 |
| $r_{14}$ = | 103.50 | | | | |
| $f_B$ = 129.72 | | | | | |
| $F_{1.2.3.}$ = −92.77 | | | | | |

| | | F = 100mm, f = 1 : 2.8, ω = 37.5° | | | |
|---|---|---|---|---|---|
| $F_{1.2.3.4.}$ = 180.70 | | | | | |
| $F_{1.2.3.4.5.}$ = −91.37 | | | | | |

EXAMPLE III

| | | F = 100mm, f = 1 : 2.8, ω = 37.5° | | | |
|---|---|---|---|---|---|
| $r_1$ = | 105.26 | $d_1$ = | 4.56 | $n_1/\nu_1$ = | 1.49782/66.8 |
| $r_2$ = | 87.94 | $d_2$ = | 5.47 | | |
| $r_3$ = | 124.03 | $d_3$ = | 9.44 | $n_2/\nu_2$ = | 1.67790/50.7 |
| $r_4$ = | 635.67 | $d_4$ = | 0.35 | | |
| $r_5$ = | 192.45 | $d_5$ = | 5.23 | $n_3/\nu_3$ = | 1.62041/60.3 |
| $r_6$ = | 33.68 | $d_6$ = | 33.16 | | |
| $r_7$ = | 91.39 | $d_7$ = | 24.42 | $n_4/\nu_4$ = | 1.80440/39.6 |
| $r_8$ = | −156.37 | $d_8$ = | 12.95 | | |
| $r_9$ = | −168.91 | $d_9$ = | 4.21 | $n_5/\nu_5$ = | 1.84666/23.9 |
| $r_{10}$ = | 105.22 | $d_{10}$ = | 4.88 | | |
| $r_{11}$ = | −265.24 | $d_{11}$ = | 10.28 | $n_6/\nu_6$ = | 1.61800/63.4 |
| $r_{12}$ = | −55.36 | $d_{12}$ = | 0.88 | | |
| $r_{13}$ = | −305.26 | $d_{13}$ = | 8.49 | $n_7/\nu_7$ = | 1.61800/63.4 |
| $r_{14}$ = | −86.84 | | | | |
| $f_B$ = 129.28 | | | | | |
| $F_{1.2.3.}$ = −93.37 | | | | | |
| $F_{1.2.3.4.}$ = 136.44 | | | | | |
| $F_{1.2.3.4.5.}$ = −121.66 | | | | | |

What is claimed is:

1. A retro-focus wide angle photographic lens system, comprising: a front lens group including a first negative meniscus lens having one surface greater in curvature than the other and oriented toward an image, a second positive lens, a fifth negative lens, and sixth and seventh positive lenses each having one surface greater in curvature than the other and oriented toward the image, the front lens group being spaced from the rear lens group, and the lens system satisfying the following conditions:

$$0.25F < d_6 < 0.38F, \quad (1)$$

$$\frac{F}{1.3} < |F_{1.2.3.}| < \frac{F}{0.7} \cdot F_{1.2.3} < 0, \quad (2)$$

$$\frac{F}{0.8} < F_{1.2.3.4} < \frac{F}{0.5}, \quad (3)$$

$$\frac{F}{1.15} < |F_{1.2.3.4.5}| < \frac{F}{0.65} \cdot F_{1.2.3.4.5} < 0, \quad (4)$$

$$F < \Sigma d < 1.5F, \text{ and} \quad (5)$$

$$0.25 < \frac{df}{db} < 0.5, \quad (6)$$

wherein:
F is the composite focal distance of the overall lens system;
$F_{1.2...i}$ is the composite focal distance of the first through the ith lenses;
dj is the lens thickness or lens distance of the ith lens;
Σd is the sum of all the lens thicknesses and lens distances;
df is the sum of the lens thicknesses and lens distances in the front group; and
db is the sum of the lens thicknesses and lens distances in the rear group;
said lens system further defined by:

| | | F = 100mm, f = 1 : 2.8, ω = 37.5° | | | |
|---|---|---|---|---|---|
| $r_1$ = | 143.59 | $d_1$ = | 4.28 | $n_1/\nu_1$ = | 1.49782/66.8 |
| $r_2$ = | 68.16 | $d_2$ = | 4.98 | | |
| $r_3$ = | 84.19 | $d_3$ = | 11.72 | $n_2/\nu_2$ = | 1.69350/50.8 |
| $r_4$ = | 774.17 | $d_4$ = | 0.35 | | |

-continued

| | | | | | |
|---|---|---|---|---|---|
| $r_5$ | = | 207.28 | $d_5$ | = | 4.21 | $n_3/\nu_3 = 1.60311/60.7$ |
| $r_6$ | = | −33.88 | $d_6$ | = | 30.00 | |
| $r_7$ | = | 88.03 | $d_7$ | = | 22.81 | $n_4/\nu_4 = 1.80440/39.6$ |
| $r_8$ | = | −167.97 | $d_8$ | = | 10.88 | |
| $r_9$ | = | −147.36 | $d_9$ | = | 8.14 | $n_5/\nu_5 = 1.80518/25.4$ |
| $r_{10}$ | = | 104.93 | $d_{10}$ | = | 5.16 | |
| $r_{11}$ | = | −278.94 | $d_{11}$ | = | 10.81 | $n_6/\nu_6 = 1.49700/81.3$ |
| $r_{12}$ | = | −47.19 | $d_{12}$ | = | 0.35 | |
| $r_{13}$ | = | −529.61 | $d_{13}$ | = | 8.74 | $n_7/\nu_7 = 1.64000/60.2$ |
| $r_{14}$ | = | −97.85 | | | | |

$f_B = 129.14$
$F_{1.2.3.} = -94.7$
$F_{1.2.3.4.} = 140.04$
$F_{1.2.3.4.5.} = -119.15$ where
$r_k$ is the radius of curvature of the kth lens,
$n_i$ is the d-line refractive index of the ith lens,
$\nu_i$ is the Abbe's number of the ith lens,
$f_B$ is the back-focus, and
$\omega$ is the half picture angle.

2. A retro-focus wide angle photographic lens system, comprising: a front lens group including a first negative meniscus lens having one surface greater in curvature than the other and oriented toward an image, a second positive lens, and a third negative meniscus lens having one surface greater in curvature than the other and oriented toward the image; and a rear lens group including a fourth positive lens, a fifth negative lens, and sixth and seventh positive lenses each having one surface greater in curvature than the other and oriented toward the image, the front lens group being spaced from the rear lens group, and the lens system satisfying the following conditions:

$$0.25F < d_6 < 0.38F, \quad (1)$$

$$\frac{F}{1.3} < |F_{1.2.3.}| < \frac{F}{0.7} \cdot F_{1.2.3} < 0, \quad (2)$$

$$\frac{F}{0.8} < F_{1.2.3.4} < \frac{F}{0.5}, \quad (3)$$

$$\frac{F}{1.15} < |F_{1.2.3.4.5}| < \frac{F}{0.65} \cdot F_{1.2.3.4.5} < 0, \quad (4)$$

$$F < \Sigma d < 1.5F, \text{ and} \quad (5)$$

$$0.25 < \frac{df}{db} < 0.5, \quad (6)$$

wherein:
F is the composite focal distance of the overall lens system;
$F_{1.2...i}$ is the composite focal distance of the first through the ith lenses;
dj is the lens thickness or lens distance of the ith lens;
$\Sigma d$ is the sum of all the lens thicknesses and lens distances;
df is the sum of the lens thicknesses and lens distances in the front group; and
db is the sum of the lens thicknesses and lens distances in the rear group;
said lens system further defined by:

| | | | | | |
|---|---|---|---|---|---|
| | | F = 100mm, f = 1 : 2.8, $\omega$ = 37.5° | | | |
| $r_1$ | = | 116.22 | $d_1$ | = | 4.49 | $n_1/\nu_1 = 1.65160/58.6$ |
| $r_2$ | = | 73.68 | $d_2$ | = | 6.21 | |
| $r_3$ | = | 95.43 | $d_3$ | = | 11.44 | $n_2/\nu_2 = 1.67790/50.7$ |
| $r_4$ | = | 2280.70 | $d_4$ | = | 0.35 | |
| $r_5$ | = | 313.12 | $d_5$ | = | 4.04 | $n_3/\nu_3 = 1.62041/60.3$ |
| $r_6$ | = | 36.24 | $d_6$ | = | 28.07 | |
| $r_7$ | = | 85.63 | $d_7$ | = | 21.96 | $n_4/\nu_4 = 1.80440/39.6$ |
| $r_8$ | = | −226.37 | $d_8$ | = | 14.91 | |
| $r_9$ | = | −109.82 | $d_9$ | = | 7.68 | $n_5/\nu_5 = 1.80518/25.4$ |
| $r_{10}$ | = | 120.09 | $d_{10}$ | = | 3.96 | |
| $r_{11}$ | = | −1087.71 | $d_{11}$ | = | 11.75 | $n_6/\nu_6 = 1.61800/63.4$ |
| $r_{12}$ | = | −51.82 | $d_{12}$ | = | 0.35 | |
| $r_{13}$ | = | −421.05 | $d_{13}$ | = | 8.46 | $n_7/\nu_7 = 1.64000.60.2$ |
| $r_{14}$ | = | 103.50 | | | | |

$f_B = 129.72$
$F_{1.2.3.} = -92.77$
$F_{1.2.3.4.} = 180.70$
$F_{1.2.3.4.5.} = -91.37$ where
$r_k$ is the radius of curvature of the kth lens,
$n_i$ is the d-line refractive index of the ith lens,
$\nu_i$ is the Abbe's number of the ith lens,
$f_B$ is the back-focus, and
$\omega$ is the half picture angle.

3. A retro-focus wide angle photographic lens system, comprising: a front lens group including a first negative meniscus lens having one surface greater in curvature than the other and oriented toward an image, a second positive lens, and a third negative meniscus lens having one surface greater in curvature than the other and oriented toward the image; and a rear lens group including a fourth positive lens, a fifth negative lens, and sixth and seventh positive lenses each having one surface greater in curvature than the other and oriented toward the image, the front lens group being spaced from the rear lens group, and the lens system satisfying the following conditions:

$$0.25F < d_6 < 0.38F, \quad (1)$$

$$\frac{F}{1.3} < |F_{1.2.3.}| < \frac{F}{0.7} \cdot F_{1.2.3} < 0, \quad (2)$$

$$\frac{F}{0.8} < F_{1.2.3.4} < \frac{F}{0.5}, \quad (3)$$

$$\frac{F}{1.15} < |F_{1.2.3.4.5}| < \frac{F}{0.65} \cdot F_{1.2.3.4.5} < 0, \quad (4)$$

$$F < \Sigma d < 1.5F, \text{ and} \quad (5)$$

$$0.25 < \frac{df}{db} < 0.5, \quad (6)$$

wherein:
F is the composite focal distance of the overall lens system;
$F_{1.2...i}$ is the composite focal distance of the first through the ith lenses;
dj is the lens thickness or lens distance of the ith lens;
$\Sigma d$ is the sum of all the lens thicknesses and lens distances;
df is the sum of the lens thicknesses and lens distances in the front group; and
db is the sum of the lens thicknesses and lens distance in the rear group;
said lens system further defined by:

| | | | | | |
|---|---|---|---|---|---|
| | | F = 100mm, f = 1 : 2.8, $\omega$ = 37.5° | | | |
| $r_1$ | = | 105.26 | $d_1$ | = | 4.56 | $n_1/\nu_1 = 1.49782/66.8$ |
| $r_2$ | = | 87.94 | $d_2$ | = | 5.47 | |
| $r_3$ | = | 124.03 | $d_3$ | = | 9.44 | $n_2/\nu_2 = 1.67790/50.7$ |
| $r_4$ | = | 635.67 | $d_4$ | = | 0.35 | |
| $r_5$ | = | 192.45 | $d_5$ | = | 5.23 | $n_3/\nu_3 = 1.62041/60.3$ |
| $r_6$ | = | 33.68 | $d_6$ | = | 33.16 | |
| $r_7$ | = | 91.39 | $d_7$ | = | 24.42 | $n_4/\nu_4 = 1.80440/39.6$ |
| $r_8$ | = | −156.37 | $d_8$ | = | 12.95 | |
| $r_9$ | = | −168.91 | $d_9$ | = | 4.21 | $n_5/\nu_5 = 1.84666/23.9$ |
| $r_{10}$ | = | 105.22 | $d_{10}$ | = | 4.88 | |
| $r_{11}$ | = | −265.24 | $d_{11}$ | = | 10.28 | $n_6/\nu_6 = 1.61800/63.4$ |
| $r_{12}$ | = | −55.36 | $d_{12}$ | = | 0.88 | |

-continued

| F = 100mm, f = 1 : 2.8, ω = 37.5° | | |
|---|---|---|
| $r_{13}$ = −305.26 | $d_{13}$ = 8.49 | $n_7 / \nu_7$ = 1.61800/63.4 |
| $r_{14}$ = −86.84 | | |

$f_B$ = 129.28

$F_{1.2.3.}$ = −93.37

$F_{1.2.3.4.}$ = 136.44

-continued

| F = 100mm, f = 1 : 2.8, ω = 37.5° |
|---|
| $F_{1.2.3.4.5}$ = −121.66 | where
$r_k$ is the radius of curvature of the kth lens,
$n_i$ is the d-line refractive index of the ith lens,
$\nu_i$ is the Abbe's number of the ith lens,
$f_B$ is the back-focus, and
ω is the half picture angle.

* * * * *